United States Patent [19]
Ansaloni et al.

[11] Patent Number: 4,718,331
[45] Date of Patent: Jan. 12, 1988

[54] APPARATUS FOR COOKING PASTE FOODS

[75] Inventors: Gloriana Ansaloni, Castel S. Pietro Terme; Giuliana De Franceschi, Castenaso, both of Italy

[73] Assignee: B. B. D. S. R. L., Bologna, Italy

[21] Appl. No.: 841,225

[22] Filed: Mar. 19, 1986

[30] Foreign Application Priority Data

Mar. 26, 1985 [IT]  Italy .................................. 3380 A/85

[51] Int. Cl.⁴ ........................ A47J 19/00; A47J 43/04
[52] U.S. Cl. ...................................... 99/352; 99/355; 99/403; 99/407
[58] Field of Search ................ 99/403, 407, 409, 326, 99/352, 355

[56] References Cited

U.S. PATENT DOCUMENTS

| | | | |
|---|---|---|---|
| 3,937,135 | 2/1976 | Pratolongo | 99/352 |
| 4,437,395 | 3/1984 | Speaker | 99/355 |
| 4,543,878 | 10/1985 | Luchetti | 99/407 X |

*Primary Examiner*—Louis K. Rimrodt
*Attorney, Agent, or Firm*—Stevens, Davis, Miller & Mosher

[57] ABSTRACT

A pasta cooking apparatus which includes first and second chambers connected by a first pipe controlled by a first valve. The first chamber is in communication with the ambient by means of a second pipe controlled by a second valve. A saturated steam circulation system includes a coiled pipe immersed in an oil container and brought to a high temperature by electrical resistance elements located in the container. Electrical sensors in the container are employed to control the temperature of the oil.

6 Claims, 2 Drawing Figures

APPARATUS FOR COOKING PASTE FOODS

The present invention relates to apparatus by means of which an express and complete cooking of spaghetti, bucatini or other types of "pasta" is obtained; in particular it relates to apparatus suitable for use in restaurants, motels, snack bars and similar, in order to offer customers portions of "pasta" cooked and seasoned by an automatic distribution process.

Equipment for an automatic and express cooking of paste food are well-known. They essentially contain: a first chamber suitable for being hermetically closed and into which a certain quantity of paste is inserted; a pump suitable to send water of high pressure and high temperature into the aforesaid chamber; a second atmospheric pressure chamber into which the paste, pre-cooked by the first chamber, is sent in order to reach its correct point of cooking.

The defects presented by prior art equipment essentially result from their employment of direct water heating by an electrical resistance placed inside a boiler. This gives rise to the following troubles: The boiler must be conveniently dimensioned in order to resist the hot water pressure; the water develops a strong heating inertia, accompanied by a remarkable dispersion of heat during the stage of water input into the first chamber, with a consequent necessity of heating a super-abundant quantity of water in comparison with the water needed for cooking a certain quantity of paste.

The present invention is directed to solving the above mentioned defects. The invention, as characterized in the claims, solves the problem of creating equipment suitable for obtaining quick and complete cooking of spaghetti or other types of paste food.

By the employment of apparatus in accordance with the present invention, the following results are obtained: The heat needed for the cooking of the "pasta" does not remarkably reduce the thermic state of the saturated steam, which will thus be employed for successive cooking cycles; consequently, there is a continuity of steam of correct pressure and temperature without any employment of plants for a short period erogation of considerable quantities of heat, and this, too, due to the reduced water mass needed for cooking a standard weight of paste.

The advantages provided by the present invention derive essentially from the fact that the heating fluid is oil for heating plants contained inside of a tank; in this way the pressure operating on the walls of the tank, even at oil temperatures around 130°–140° C., is less than the atmospheric pressure. Furthermore, the embodiment of oil as a heat exchanging means allows a reduction in the thermic inertia of the heating means and the quantity of cooking water to be maintained within limits so as to favour an almost unbroken succession of cooking cycles.

The invention is illustrated in detail by means of the attached drawings showing a non-limiting embodiment of the invention.

Figure 1:
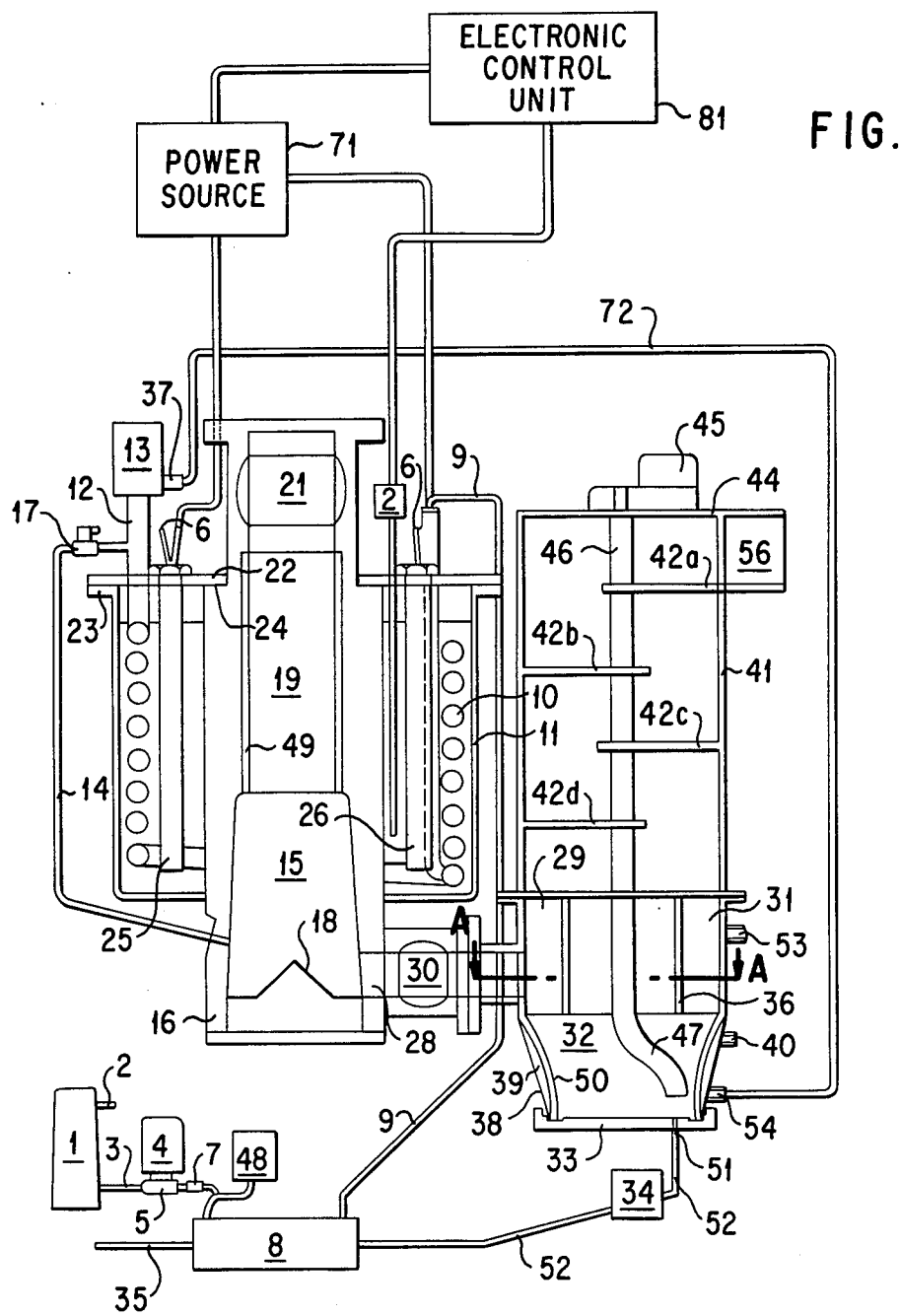
FIG. 1 is a schematic partial sectional view of an apparatus according to the present invention.

The figures shown an apparatus of the above-mentioned type. FIG. 1 in particular shows an apparatus including: a water conditioner 1 with an inlet pipe 2 and an outlet pipe 3; a pump 4 linked to the outlet pipe 3 by means of a channel 5 and suitable to send water under pressure, through a check-valve 7, to a hydraulic system containing a heat exchanger 8 and a channel 9 linking the exchanger 8 to a coiled pipe 10 housed inside of a container 11 and immerged in oil of the type employed for heating plants. The coiled pipe 10, inside of which the water coming from the channel 9 is receiving heat from the oil already brought to the appropriate temperature in order to change into saturated steam, ommunicates, by means of a pipe 12, with a pressure maintenance valve 13, suitable to open at a pre-established value of the pressure difference between the inside and the outside of pipe 12. The pressure inside of channel 9 is measured by a differential type monostat 48 of known type, electrically connected with a relay of known type connected, in turn, with the pump 4. The pipe 12 is connected, by means of a solenoid-valve 17, with a last pipe 14 which flows into a first pre-cooking chamber 15; the solenoid-valve 17 is automatically driven by an electronic central unit, 81 in order to allow a timed flow of saturated steam towards the first chamber 15. This latter is housed inside of a cylindrical body 16 concentric with the container 11 and made of material suitable to resist the pressure forces due to the saturated steam.

Figure 2:
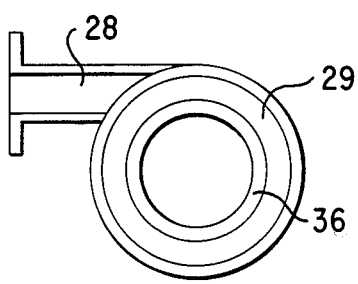
FIG. 2 is a detailed view along section A—A of FIG. 1.

The lower part of the chamber 15 includes a cone-shaped wall 18 suitable to keep a bunch of spaghetti open, which is inserted in said chamber 15 in order that its single noodles may not stick together. The upper part of the chamber 15 communicates with a pipe 19 formed by a bushing 49 coaxial with the body 16 through which the chamber 15 is communicates with a pierced sleeve 20, rigidly linked to the body 16 and containing a first pressure-proof valve 21 pneumatically driven by a device of known type (not shown) and subject to the control of the electronic central unit 81. The bushing 49 is made of plastic material for pharmaceutical and alimentary use suitable to resist temperatures much higher than those reached inside of pipe 19 and to hinder the sticking of the "pasta" to its walls during cooking. From FIG. 1, it is apparent that the container 11 envelopes the body 16 almost completely and that it is coaxial therewith in order to avoid heat dispersions and to maintain inside of the chamber 15 and the pipe 19 a temperature suitable to avoid considerably lowering the temperature of the saturated steam coming from the pipe 14. The container 11 is closed on its upper part by an annular cover 22 rigidly linked, in its outer part, to an edge 23 of container 11 and, in its inner part, to a planishing 24 on body 16. Through cover 72 pass: the channel 9 and the pipe 12, two heating electrodes 25 and 26 suitable to heat, by means of the Joule effect, the oil inside of container 11, and to this purpose connected, by means of rheofores 6, with an electric power source 71; furthermore, there is an oil-immerged thermostat 27, connected with the central unit 81, for temperature control. The lower part of the chamber 15 is linked, by means of an outlet pipe 28, to a second chamber 29; the pipe 28 is equipped with a second pressure maintenance valve 30 which is pneumatically driven in the same way as the valve 21. The second chamber 29 consists of an upper cylindrical part 31 and a lower part 32 whose wall 50, of rotary symmetry, develops, according to an axis common to part 31, i.e. like a paraboloid. The lower part 32 is closed by a movable bottom plate 33 suitable to open lower part 32; a pneumatic system, not shown, subject to the control of the central unit 81, is suitable for the accomplishment of the opening and closing of bottom plate 33 by synchronizing its opening with the end of the paste cooking. The bottom plate 33 presents a boring 51 for the linkage of a flexible pipe 52 suitable to convey, by means of pump 34, recovered water to the heat exchanger 8 which is equipped with an outlet 35. The upper cylindrical part 31 of the second chamber 29 contains in its axis a cylindrical sleeve 36; as seen in on FIG. 2, the outlet pipe 28 enters the second chamber tangentially with regard to sleeve 36, in order to obtain a rotary movement of the saturated steam and of the paste, which leave chamber 15 under pressure. The wall of the upper part 31 is linked a tube 53 which provides for the introduction of pickle into the said second chamber 29 and is equipped with a pump, driven by the central unit and suitable to convey the pickle to the chamber 29. The outlet 37 of the pressure maintenance valve 13 is linked, by means of a piping 72 (not shown), to an inlet 54 fitted in a wall 38 of truncate-conical shape, which envelops wall 50 so as to form a space 39 in which water of high temperature is circulating in order to keep the inside of the second chamber 29 warm; the water is pushed outside by means of an outlet 40. The second chamber 29 supports in its axis a cylindrical body 41 which presents inside four semi-circular segments or baffles 42i a, 42b, 42c and 42d, suitable to provoke a slowing down of the flow of steam freeing itself in chamber 29 when this latter is put in communication with chamber 15 and moving towards an outlet 56. An upper wall 44 closes cylindrical body 41 and supports a geared motor 45 subject to the control of the central unit and suitable to rotate a shaft 46 whose lower arched part 47 functions to stir the paste contained in the said part 32. The equipment comprehends furthermore mechanisms, not shown, for its correct working; in the following description of the working of the equipment, these mechanisms will be described.

Now we are describing the working of the equipment according to the present invention in order to facilitate the comprehension of its components. First, it is assumed that the oil in the container 11 is of ambient temperature and that the channel 9 and the pipe 12, the exchanger 8 and the coiled pipe 10 are devoid of water. After having closed the valves 21 and 30, pump 4 is operated in order to send the water coming from the inlet 2, from the conditioner 1 and from the outlet 3 to the exchanger 8, to the channel 9, to the coiled pipe 10 and to the pipe 12. Inside this hydraulic system, the pressure will rise until reaching a value pre-estabished by appropriate calibration of the differential type manostat 48. When this value is reached, the manostat 48 sends an electrical signal to the relay of pump 4, this signal being suitable to control operation of the pump. The electric central unit 81 and the electrodes 25 and 26 are connected with the electric power source for the warming up of the oil, and while the temperature of the oil is rising, the pressure of the hydraulic system tends to increase. The pressure maintenance valve 13 limits this increase by opening the outlet 37 linked to the inlet 54; the exceeding saturated steam enters the space 39 in order to preheat the part 29. As soon as the working temperature in the hydraulic system is reached, there will be available saturated steam at a constant pressure such as pre-established by appropriate calibration of the valve 13. Then the valve 21 is opened, and a portion of "pasta" enters chamber 15. Afterwards, the valve 21 is closed again. The solenoid-valve 17 is opened by means of an apposite electric signal coming from the central unit 81, wherefore the steam flows from the pipe 14 to the chamber 15, always maintaining a temperature much higher than 100° C. In the above-described system, the pressure falls abruptly, and consequently, the manostat 48 will send, by means of the relay, an electric signal to the pump 4, in order to resent its running and to convey the needed water into the aforesaid system. The solenoid-valve 17 is closed after a pre-fixed time during which a high temperature pre-cooking of the "pasta" is brought about in chamber 15. At the end of the aforesaid time, the valve 30 is opened and, due to the pressure difference existing between the chamber 15 and the chamber 29, the paste and the saturated steam pass through the pipe 28 and the open valve 30 into the second chamber 32 where they arrive with a rotational movement around the sleeve 36 in order to fall, by force of gravity, into the second part 32. The above-mentioned pump sends pickle through the tube 53, and contemporaneously, the shaft 46, whose arched part 47 provides for the stirring of the "pasta", starts rotating, driven by the geared motor 45. Inside of chamber 29 the temperature stays around 100° C., in spite of the development of steam moving towards the outlet 55, whereas the water is let out from the boring 51 and reaches, through the pipe 52 and the pump 34, the heat exchanger 8, in order to preheat the water contained in this latter. After a certain residence time in the chamber 29, the "pasta" will have reached its right degree of cooking, and the pneumatic system will open the bottom plate 33 so that the paste may fall on a dish underneath.

In view of the above, it is clear that the apparatus of the invention is suitable for carrying out very quick cooking cycles, in so much as the crude paste may be put into the chamber 15 while the chamber 19 still contains "pasta" close to its best point of cooking. It is also possible to provide for a device for the automatic loading of the pipe 19.

For the improvement of its operation, the entire apparatus may be subject to modifications.

The employed moulds, dimensions and materials do not limit the importance of the present invention, each element of which may be replaced by another technically equivalent one without departing from the spirit and scope of the invention.

We claim:

1. An apparatus for cooking paste foods, comprising:
a first chamber having an inlet;
a second chamber having a movable bottom plate adapted to open said second chamber responsive to actuation by a driving mechanism;
a communication duct interconnecting said first chamber and said second chamber;
a first valve for controlling fluid flow through said inlet to said first chamber;
a second valve for controlling fluid flow through said communication duct;
a coiled pipe for conveying water and steam;
a hydraulic system comprising in series a pump having a relay, a heat exchanger and a first duct to convey water to said coiled pipe;
an oil container housing said coiled pipe and for holding oil, said container having an electric resistance means disposed therein positioned for immersion in said oil in said container and a thermostat means, said electric resistance means for heating said oil to a predetermined temperature measured by said thermostat means to yield in said coiled pipe saturated steam;

an electronic power source connected to said electric resistance means;

an electric control means connected to said electronic power source;

said thermostat means for monitoring a temperature of oil in said container and for sending signals to said electronic control means when said temperature reaches a predetermined magnitude;

a second pipe interconnecting said coiled pipe and said first chamber to convey said steam to said first chamber, said second pipe including a pressure maintenance valve for limiting a pressure of said saturated steam and a solenoid valve comprising means connected to said relay of said pump for sending a control signal to said relay when said pressure of said saturated steam in said second pipe is lower than a predetermined magnitude;

a stirring means for stirring paste in said second chamber; and means for introducing pickle into said second chamber.

2. The apparatus as in claim 1, wherein said first chamber is enveloped by said container.

3. An apparatus as in claim 2, wherein said second chamber has a truncated-cone-shaped bottom portion above said bottom plate, and said stirring means comprises a rotatable stirring shaft having an arched end portion disposed within said truncated-cone-shaped bottom portion of said second chamber.

4. An apparatus as in claim 3, further comprising means connecting said pressure maintenance valve and said second chamber, for preheating said second chamber with saturated steam.

5. An apparatus as in claim 4, further comprising a cylindrical body supported above and in communication with said second chamber and having an opening through which steam can escape, said cylindrical body having a plurality of baffle means for slowing down escape of steam therefrom.

6. The apparatus as in claim 1, further comprising a manostat means for monitoring a pressure in said hydraulic system and sending electric signals to said relay of said pump to control starting and stopping thereof.

* * * * *